Patented Apr. 7, 1936

2,036,530

UNITED STATES PATENT OFFICE 2,036,530

CONVERSION PRODUCTS OF N-NITRAMINES OF PRIMARY AROMATIC AMINES NITRATED IN THE NUCLEUS AND PROCESS OF MAKING SAME

Oskar Knecht, Binningen, near Basel, Markus Kappeler, Basel, and Carl Apotheker, Riehen, near Basel, Switzerland, assignors to the firm of Society of Chemical Industry in Basle, Basel, Switzerland No Drawing. Application January 17, 1935, Serial No. 2,266. In Switzerland January 27, 1934

18 Claims. (Cl. 260—124)

The N-nitramines of primary aromatic amines have hitherto been made by oxidation of N-nitroso-compounds of the corresponding amines or by treatment of the nitrate of the amine with dehydrating agents, such as acetic anhydride.

The oxidation process is of no use for amines whose diazo-compounds are decomposed by alkalies; the dehydration process fails in the case of such amines as do not contain strongly negative substituents, such as nitro-groups.

This invention is based on the observation that N-nitramines of primary aromatic amines nitrated in the nucleus can be so treated with reducing agents that merely the aromatically bound nitro-group is attacked. There are thus obtained new conversion products of the said nitramines, which are themselves new aromatic nitramines hitherto not available. In practice the process of the invention consists in treating the nitro-N-nitramine with a reducing agent in neutral or alkaline medium, i. e. in a medium whose pH is not smaller than 7. It is possible to conduct the treatment with the reducing agent in such a manner that the reduction occurs in stages. Thus there may be obtained products which are characterized by containing in the same molecule, on the one hand, an NH-NO₂-group and, on the other hand, such a group which has been formed by reduction of a nitro-group. Such products are for example the azo- or amino-aryl-nitramines, such as for instance

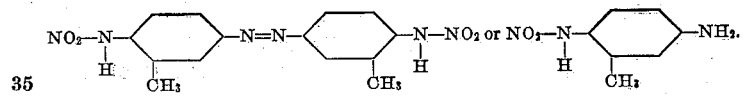

This expression is intended to cover also further conversion products of the above compounds, for example their N-acylamino derivatives, such as

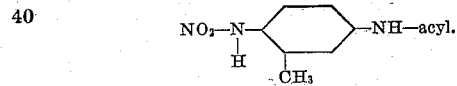

The reaction is not restricted to the benzene series, it can be applied quite generally to nucleally nitrated N-nitramines of amines of the various aromatic series, such as the naphthalene series, the anthracene series, the anthraquinone series etc. besides the benzene series.

The following examples illustrate the invention, the parts being by weight:—

Example 1

To a suspension of 99 parts of 1-amino-4-nitro-2,5-dimethoxybenzene in 150 parts of hydrochloric acid of 30 per cent. strength, 375 parts of water and 200 parts of ice, there is added, by drops, a solution of 36 parts of sodium nitrite in 75 parts of water. The mixture is stirred for 30 minutes at 10–12° C. and then filtered from impurities.

This diazo-solution is now added by drops, at −5° to 0° C., to a solution of 100 parts of sodium hydroxide in 1800 parts of water. There are then added 4000 parts of ice, 325 parts of sodium hypochlorite solution, containing 11.8 per cent. of available chlorine, and the whole is stirred for 20 hours. After filtration from impurities, the filtrate is mixed by stirring, with 1500 parts of common salt, whereby the sodium salt of the nitramine of 1-amino-4-nitro-2,5-dimethoxybenzene of the formula

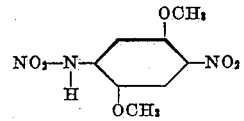

is salted out in pure condition in the form of orange yellow leaflets.

132 parts of this sodium salt are dissolved in 1320 parts of water and there are added to the solution, at boiling temperature, 100 parts of sodium sulphide in small portions. The solution, which is at first orange-red, becomes colourless

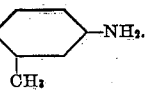

after a short time. It is filtered, while hot, from impurities and by addition of common salt there is caused to separate, on cooling, the sodium salt of the mono-N-nitramine of 1:4-diamino-2:5-dimethoxybenzene of the probable formula

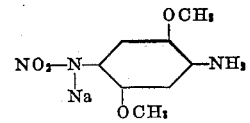

in the form of a colourless crystalline powder.

Printed with the anilide of 2,3-hydroxynaphthoic acid and an alkali nitrite, the dyestuff behaves in a similar manner as the product of the first paragraph of the following Example 2.

Example 2

Into a boiling solution of 90 parts of sodium sulphide of 60 per cent. strength in 400 parts of water, there are introduced, in doses, while stirring well, 87.6 parts of the sodium salt of the nitramine of 1-amino-2-methyl-4-nitrobenzene. While there is a lively reaction the nitro-product is rapidly reduced and the solution is finally bright yellow. To isolate the product of reduction, the solution is evaporated, for example in a vacuum, to dryness and the honey-yellow residue is extracted with ethanol at the usual temperature or a slightly raised temperature. The sodium salt of the 1-nitramino-2-methyl-4-aminobenzene is thereby dissolved and may be obtained in a solid form by evaporating the ethanol.

When the solution of the reduction product or the solution of the pure sodium salt of the amino-N-nitramine is poured into an excess of hydrochloric acid in presence of ice, the free 1-nitramino-2-methyl-4-amino-benzene of the probable formula

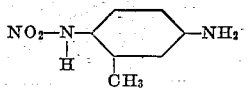

is precipitated in the form of small, almost colourless needles.

The procedure is similar in making other amino-nitramines; thus, from the N-nitramine of 1-amino-2,5-dichloro-4-nitrobenzene there is obtained the 1-nitramino-2,5-dichloro-2-aminobenzene, whose sodium salt is a colourless crystalline powder.

The 1,4-amino-N-nitramines may be both monodiazotized and tetrazotized. By printing on cotton, for example, a thickening which contains 2:3-hydroxynaphthoic acid-anilide and for each molecule of an alkali salt of the 1-nitramino-2-methyl-4-aminobenzene one molecule of sodium nitrite, and developing, for example by means of dilute acetic acid, there is obtained a red-brown tint. On the other hand, by using at least two molecules of nitrite and developing by passing the goods first through dilute sulfuric acid and then through dilute sodium carbonate solution, there is obtained a dark blue print.

Example 3

To a boiling solution of 19.7 parts of the 1-nitramine of 1-amino-2-nitro-4-methylbenzene in 150 parts of water and about 12 parts of an aqueous solution of sodium hydroxide of 40° Bé., there are added gradually 33 parts of sodium sulfide of 60 per cent. strength dissolved in 200 parts of water. After the addition of the reducing agent the whole is boiled for a short time until the reaction is complete, as indicated by the solution which is at first brown, becoming bright yellow. The solution having been filtered, if necessary, is then mixed with about 10 per cent. of sodium chloride, whereby the sodium salt of the 1-N-nitramino-2-amino-4-methyl-benzene of the probable formula

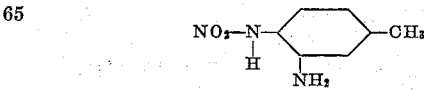

is caused to crystallize in colourless or yellowish leaflets. After cooling, the precipitate is filtered and washed with a sodium chloride solution.

An aqueous solution of the sodium salt thus obtained is mixed with the calculated quantity of sodium nitrite to produce diazotization and the mixture is poured into an excess of dilute acid; the diazo-compound is not obtained but a yellowish crystalline precipitate which does not react with coupling components and crystallizes from ethanol in the form of long, yellowish needles of melting point 91–92° C.; this product may be supposed to be 1-nitro-5-methyl-benztriazole.

In an analogous manner other nitramines of the type of the N-nitramine of ortho-nitraniline, as, for example, the N-nitramine of ortho-nitraniline itself or of 1-amino-2-nitro-4-chlorobenzene, may be converted into the corresponding 1-nitramino-2-aminobenzene derivative. The reaction is also applicable to m-nitraniline derivatives.

Example 4

To a suspension of 113 parts of 1-amino-4-nitro-2,5-diethoxybenzene in 150 parts of hydrochloric acid of 30 per cent. strength, 375 parts of water and 200 parts of ice there are added, by drops, a solution of 36 parts of sodium nitrite in 75 parts of water. Stirring is continued for 30 minutes at 10–12° C., and the liquid is then filtered from impurities.

This diazo-solution is added by drops at −5° to 0° C. to a solution of 100 parts of sodium hydroxide in 1800 parts of water; there are then added 4000 parts of ice and 325 parts of sodium hypochlorite solution, containing 11.8 per cent. of available chlorine, and the whole is stirred for 20 hours. The mass is then filtered from impurities and to the filtrate are added while stirring, 1500 parts of common salt. The sodium salt of the N-nitramine of 1-amino-4-nitro-2,5-diethoxybenzene separates in the form of pure orange-yellow leaflets.

146 parts of this sodium salt are dissolved in 1320 parts of water and, at boiling temperature, the solution is mixed with 100 parts of sodium sulfide, added in small portions; the solution, which is at first orange-red, soon becomes colourless. After filtering hot from some impurities, the liquid receives an addition of common salt and, on cooling, the sodium salt of the mono-N-nitramine of 1,4-diamino-2,5-diethoxybenzene crystallizes in the form of a colourless powder.

133 parts of this sodium salt and 50 parts of sodium hydroxide are dissolved together in 1250 parts of water; at 50–60° C. there are added, in drops, 78 parts of benzoyl chloride in the course of 2 hours, while stirring. After filtering hot, the filtrate is mixed with common salt; on cooling, the sodium salt of the N-nitramine of 1-amino-4-benzoylamino-2,5-diethoxybenzene of the probable formula

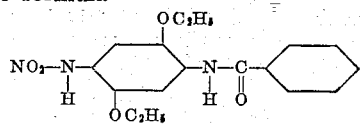

separates.

Example 5

A solution of 19.7 parts of the N-nitramine of 1-amino-2-methyl-4-nitrobenzene in 200 parts of water and 40 parts of an aqueous solution of sodium hydroxide of 40° Bé. is treated, while stirring, first at the ordinary temperature and then at 80–90° C., with 20 parts of zinc dust. After some time the zinc mud is filtered and the filtrate mixed with acetic acid, whereby a green yellow precipitate is formed. It is filtered, washed and recrystallized from methanol. This reduction product, apparently the dinitramine of 4,4′-diamino-3,3'-dimethyl-azobenzene of the probable formula

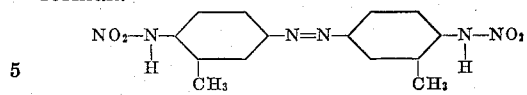

is a yellow brown crystalline powder which deflagrates, when heated, without melting and is freely soluble in aqueous solutions of alkali hydroxides and carbonates. When printed together with 2,3-hydroxynaphthoic acid-anilide and nitrite and developed by treatment with acid it yields a brownish-violet tint.

What we claim is:—

1. Process for the manufacture of conversion products of N-nitramines of aromatic amines of the benzene series nitrated in the nucleus, consisting in treating these compounds with reducing agents in such a medium whose pH is greater than 7.

2. Process for the manufacture of conversion products of N-nitramines of the benzene series which are substituted in the 4-position to the N-nitramine-group by a nitro-group, consisting in treating these compounds with reducing agents in such a medium whose pH is greater than 7.

3. Process for the manufacture of conversion products of N-nitramines of the benzene series which are substituted in the 4-position to the N-nitramine-group by a nitro-group, consisting in treating these compounds with alkaline sulfides.

4. Process for the manufacture of conversion products of N-nitramines of the benzene series which are substituted in the 4-position to the N-nitramine-group by a nitro-group, consisting in treating these compounds with sodium sulfide.

5. Process for the manufacture of conversion products of N-nitramines of the benzene series which are substituted in the 4-position to the N-nitramine-group by a nitro-group and in ortho-position to the N-nitramine-group by a methyl-group, constituting in treating these compounds with sodium sulfide.

6. Process for the manufacture of conversion products of N-nitramines of the benzene series which are substituted in the 4-position to the N-nitramine-group by a nitro-group and in ortho-position to the N-nitramine-group by an alkoxy-group, consisting in treating these compounds with sodium sulfide.

7. Process for the manufacture of conversion products of N-nitramines of the benzene series which are substituted in the 4-position to the N-nitramine-group by a nitro-group and in ortho-position to the N-nitramine-group by a methoxy-group, consisting in treating these compounds with sodium sulfide.

8. Process for the manufacture of conversion products of N-nitramines of the benzene series which are substituted in the 4-position to the N-nitramine-group by a nitro-group and in ortho-position to the N-nitramine-group by an ethoxy-group, consisting in treating these compounds with sodium sulfide.

9. Process for the manufacture of conversion products of the N-nitramine of 1-amino-2-methyl-4-nitrobenzene, consisting in treating this product with sodium sulfide.

10. Process for the manufacture of conversion products of the N-nitramine of 1-amino-2,5-dimethoxy-4-nitrobenzene, consisting in treating this product with sodium sulfide.

11. Process for the manufacture of conversion products of the N-nitramine of 1-amino-2,5-diethoxy-4-nitrobenzene, consisting in treating this product with sodium sulfide.

12. The conversion products of N-nitramines of aromatic amines of the benzene series nitrated in the nucleus, characterized by containing in the same molecule an NH—NO$_2$-group and an acylated amino-group, which products form alkali salts with alkalies and can be converted into diazo-compounds by treating with alkali nitrites and acids.

13. The conversion products of N-nitramines of aromatic amines nitrated in the nucleus, characterized by containing in the same molecule an NH—NO$_2$-group and a benzoylamino-group, which products form alkali salts with alkalies and can be converted into diazo-compounds by treating with alkali nitrites and acids.

14. The benzene derivatives containing on the one hand an NH—NO$_2$-group, and, on the other hand, a benzoylamino-group, which products form alkali salts with alkalies and can be converted into diazo-compounds by treating with alkali nitrites and acids.

15. The benzene derivatives containing on the one hand an NH—NO$_2$-group in 1-position and, on the other hand, a benzoylamino-group in 4-position, which products form alkali salts with alkalies and can be converted into diazo-compounds by treating with alkali nitrites and acids.

16. The compounds of the general formula

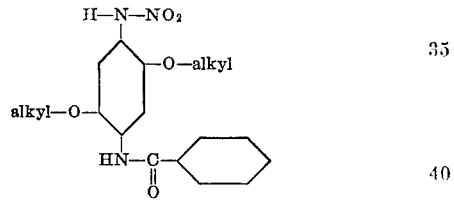

which products form alkali salts with alkalies and can be converted into diazo-compounds by treating with alkali nitrites and acids.

17. The compound of the formula

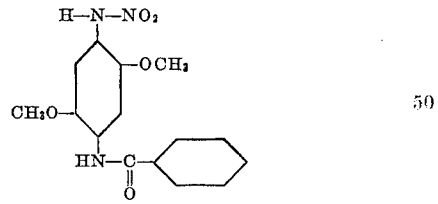

which product forms alkali salts with alkalies and can be converted into a diazo-compound by treating with alkali nitrites and acids.

18. The compound of the formula

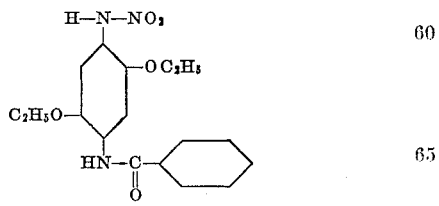

which product forms alkali salts with alkalies and can be converted into a diazo-compound by treating with alkali nitrites and acids.

OSKAR KNECHT.
MARKUS KAPPELER.
CARL APOTHEKER.